United States Patent
Wellbrock et al.

(10) Patent No.: US 9,590,736 B2
(45) Date of Patent: Mar. 7, 2017

(54) USING FLOATING TRANSPORT CARD FOR BEST EFFORT TRAFFIC

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/584,641

(22) Filed: Dec. 29, 2014

(65) Prior Publication Data
US 2015/0117851 A1 Apr. 30, 2015

Related U.S. Application Data (63) Continuation-in-part of application No. 13/975,968, filed on Aug. 26, 2013.

(51) Int. Cl.
| | |
|---|---|
| *H04B 10/27* | (2013.01) |
| *H04B 10/03* | (2013.01) |
| *H04B 10/032* | (2013.01) |
| *H04J 14/02* | (2006.01) |
| *H04Q 11/00* | (2006.01) |
| *H04L 12/24* | (2006.01) |
| *H04L 12/707* | (2013.01) |

(Continued)

(52) U.S. Cl.
CPC ............. *H04B 10/27* (2013.01); *H04B 10/03* (2013.01); *H04B 10/032* (2013.01); *H04J 14/021* (2013.01); *H04J 14/0294* (2013.01); *H04L 41/0806* (2013.01); *H04L 41/0816* (2013.01); *H04L 41/0668* (2013.01); *H04L 41/0823* (2013.01); *H04L 45/22* (2013.01); *H04L 45/28* (2013.01); *H04L 45/62* (2013.01); *H04Q 2011/0086* (2013.01)

(58) Field of Classification Search
CPC ............... H04B 10/032; H04J 14/0294; H04L 41/0668; H04L 45/22; H04L 41/0681
See application file for complete search history.

(56) References Cited

U.S. PATENT DOCUMENTS

| | | | | |
|---|---|---|---|---|
| 6,222,653 B1 * | 4/2001 | Asahi | ................. | H04J 14/0283 398/4 |
| 6,567,194 B1 * | 5/2003 | Badr | ................... | H04J 14/0294 370/222 |

(Continued)

*Primary Examiner* — Shi K Li
*Assistant Examiner* — Mina Shalaby (57) ABSTRACT

A network management device monitors an optical network that is configured for a required bandwidth. The optical network includes multiple optical nodes and a plurality of light paths between the multiple optical nodes. The multiple optical nodes include transport cards with a majority of the transport cards provisioned as active cards to receive a traffic load of up to full capacity of the transport cards, and with a minority of the transport cards provisioned as floating spare cards for the active cards. The network management device identifies an unused first floating spare card and an unused second floating spare card in a pair of the multiple optical nodes and automatically provisions, by the network management device, the first floating spare card and the second floating spare card to service a light path for best-effort traffic between the pair of the multiple optical nodes.

20 Claims, 8 Drawing Sheets

(51) Int. Cl.
*H04L 12/721* (2013.01)
*H04L 12/703* (2013.01)

(56) References Cited

U.S. PATENT DOCUMENTS

| | | | |
|---|---|---|---|
| 2002/0172148 A1* | 11/2002 | Kim | H04L 12/14 370/216 |
| 2005/0025489 A1 | 2/2005 | Aldridge et al. | |
| 2008/0074732 A1 | 3/2008 | Stephens | |
| 2013/0011136 A1* | 1/2013 | Hao | H04Q 11/00 398/45 |
| 2013/0216216 A1* | 8/2013 | Bottari | H04J 14/0212 398/5 |
| 2013/0272693 A1* | 10/2013 | Zhang | H04J 14/0212 398/5 |

* cited by examiner

USING FLOATING TRANSPORT CARD FOR BEST EFFORT TRAFFIC

CROSS-REFERENCE TO RELATED APPLICATION

This application is a continuation-in-part of co-pending U.S. patent application Ser. No. 13/975,968, entitled "Protection in Metro Optical Networks" for Wellbrock et al. and filed on Aug. 26, 2013, the content of which is hereby incorporated by reference.

BACKGROUND

Routing video, data, and voice traffic at high bit rates via Ultra Long Haul (ULH) or metro optical networks is substantially increasing in modern communications systems. Some variants of such systems transmit optical signals through optical fibers via dense wavelength division multiplexing (DWDM), in which multiple wavelengths of light are transmitted simultaneously through a single fiber. DWDM systems typically employ devices called reconfigurable optical add/drop multiplexers (ROADMs) to add and remove signals from the network in a purely optical manner, without requiring conversion to/from the electrical domain.

In a typical metro optical network architecture, traffic protection against various network failures is provided by doubling the network capacity over the projected traffic (also referred to as 1+1 protection architecture). Thus, the typical architecture offers an inefficient use of resources and limits network growth.

DETAILED DESCRIPTION OF PREFERRED EMBODIMENTS

The following detailed description refers to the accompanying drawings. The same reference numbers in different drawings may identify the same or similar elements.

An optical network may be configured to optimize network resources. The optical network may include multiple optical nodes, light paths between the multiple optical nodes, and a network monitoring device. The network monitoring device may monitor the optical network to identify a failure in the optical network and provide appropriate protection/recovery actions using a floating spare card (also referred to as a floating transport card) included at each of the optical nodes.

According to systems and methods described herein, floating spare cards, when not employed for failure recovery, may be provisioned to carry low priority traffic (e.g., packets with a Differentiated Services Code Point (DSCP) value designating a best-effort service type in a Quality of Service (QoS) environment, also referred to herein as "best-effort traffic"). More particularly, the network monitoring device may establish a data connection between a pair of available floating spare cards so best-effort traffic can be carried on the link (e.g., a light path having a particular wavelength) between the two cards when there is no need for the floating spare cards to carry protected traffic. The systems and method described herein may be used to reduce idle capacity required in typical protection schemes and reduce capital expenditures for hardware such as gray optics and transport cards.

Figure 1:
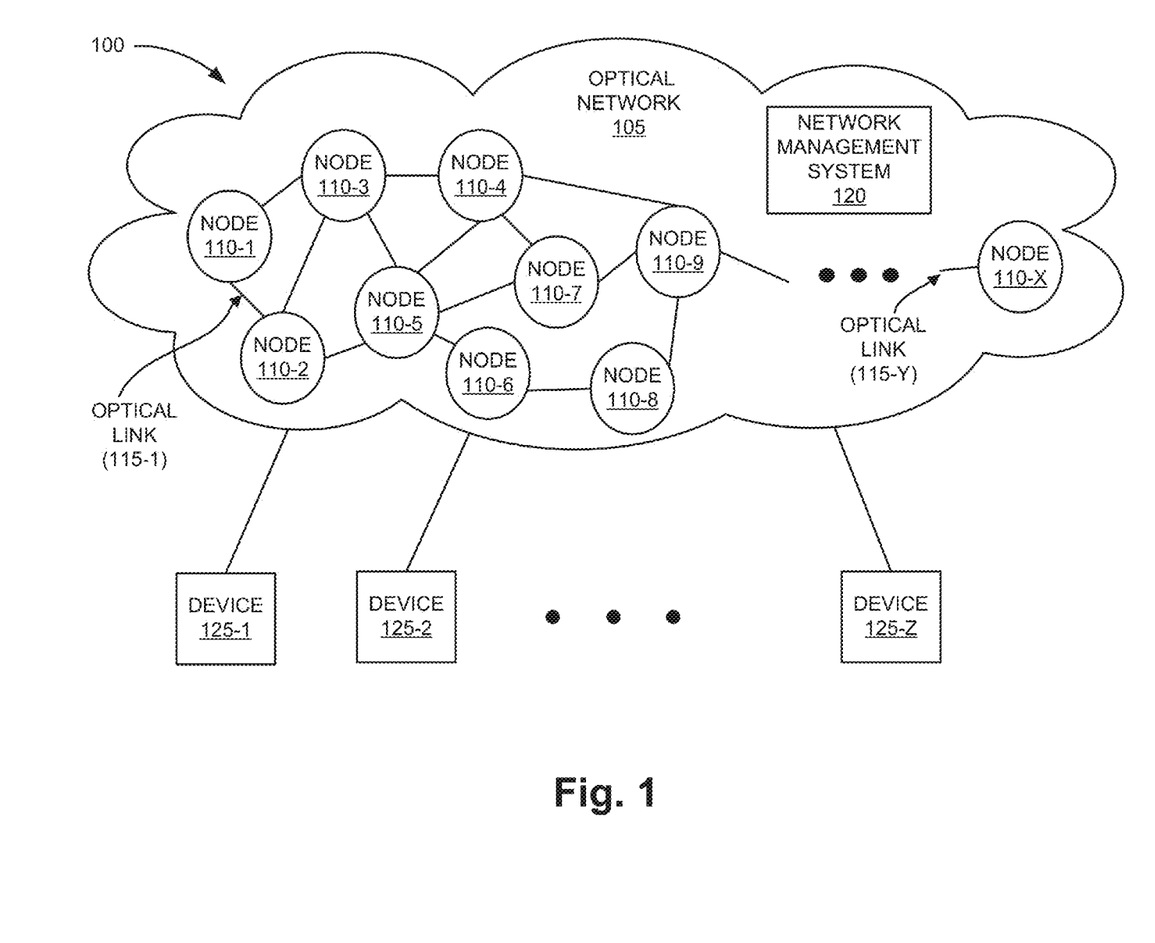
FIG. 1 is a diagram illustrating an exemplary environment in which systems and methods described herein may be implemented.

FIG. 1 is a diagram illustrating an exemplary environment of an optical network in which systems and methods described herein may be implemented. As illustrated in FIG. 1, an exemplary environment 100 includes an optical network 105 including optical node 110-1 through optical node 110-X, in which X>1 (referred to individually as "optical node 110" or collectively as "optical nodes 110"), optical link 115-1 through optical link 115-Y, in which Y>1 (referred to individually as "optical link 115" or collectively as "optical links 115"), and network management system 120. Environment 100 also includes device 125-1 through device 125-Z, in which Z>1 (referred to individually as "device 125" or collectively as "devices 125"). Devices 125 may be communicatively coupled to optical network 105 via various access technologies.

The number of devices (which include optical nodes) and the configuration in environment 100 are exemplary and provided for simplicity. According to other embodiments, environment 100 may include additional devices, fewer devices, different devices, and/or differently-arranged devices than those illustrated in FIG. 1. For example, environment 100 may include intermediary devices (not illustrated) to permit communication between devices 125 and optical network 105.

Optical network 105 may include, for example, a synchronous optical network or other types of optical networks. Optical network 105 may be implemented using various topologies (e.g., mesh, ring, etc.). According to an exemplary embodiment, optical network 105 may include a long-haul optical network (e.g., long-haul, extended long-haul, ultra long-haul) or metro network. In one implementation, optical network 105 may be implemented as an agile photonic network that uses flexible end-to-end channel allocation. According to aspects described herein, an agile photonic network may be configured to reduce capital costs over conventional optical networks. Generally, optical network 105 may enable activation of wavelengths from an optical node 110 to any other optical node 110 and may automatically provision light paths to route around points of failure.

Optical node 110 is a point in optical network 105. For example, optical node 110 may be an aggregation node (e.g., that does not communicate directly with other aggregation nodes) or a core node (e.g., that passes communications from/to aggregation nodes). Optical node 110 may be implemented as a DWDM system. Optical link 115 is an optical fiber (e.g., nonzero dispersion-shifted fiber, etc.) that communicatively couples one optical node 110 to another optical node 110.

Network management system 120 may manage the configuration of optical network 105 including the optical nodes 110. Network management system 120 may permit administrators to monitor, configure, etc., optical network 105. Network management system 120 may be capable of identifying network state information, resource availability, resource allocation, and/or other parameters pertaining to optical network 105. Network management system 120 may communicate with a network management module (e.g., network management module 240 in FIG. 2) of an optical node 110 regarding these parameters as such parameters relate to the features described herein. For example, network management system 120 may monitor optical network 105 for failures and direct corrective action to avoid communication disruptions.

In one implementation, as described further herein, network management system 120 may initiate or suggest re-routing of light paths around a failed node or fiber failure. In another implementation, as also described further herein, network management system 120 may initiate or suggest provisioning a spare transport card to replace a failed card and/or interface. In still another implementation, network management system 120 may automatically initiate or suggest provisioning a set of spare transport cards to carry best-effort traffic between different optical nodes 110 when the spare transport cards are not being utilized for failure-recovery/protection purposes. Network management system 120 may include one or more network devices (e.g., a server, a computer, etc.) including various memories and/or processors. Network management system 120 may be implemented in a centralized or a distributed fashion. For example, network management system 120 may implement systems and methods described herein within a single control domain or across multiple domains.

Device 125 may include a device having the capability to communicate with a network (e.g., optical network 105), devices and/or systems. For example, device 125 may correspond to a user device, such as a portable device, a handheld device, a mobile device, a stationary device, a vehicle-based device, or some other type of user device. Additionally, or alternatively, device 125 may correspond to a non-user device, such as, a meter, a sensor, or some other device that is capable of machine-to-machine (M2M) communication.

Figure 2:
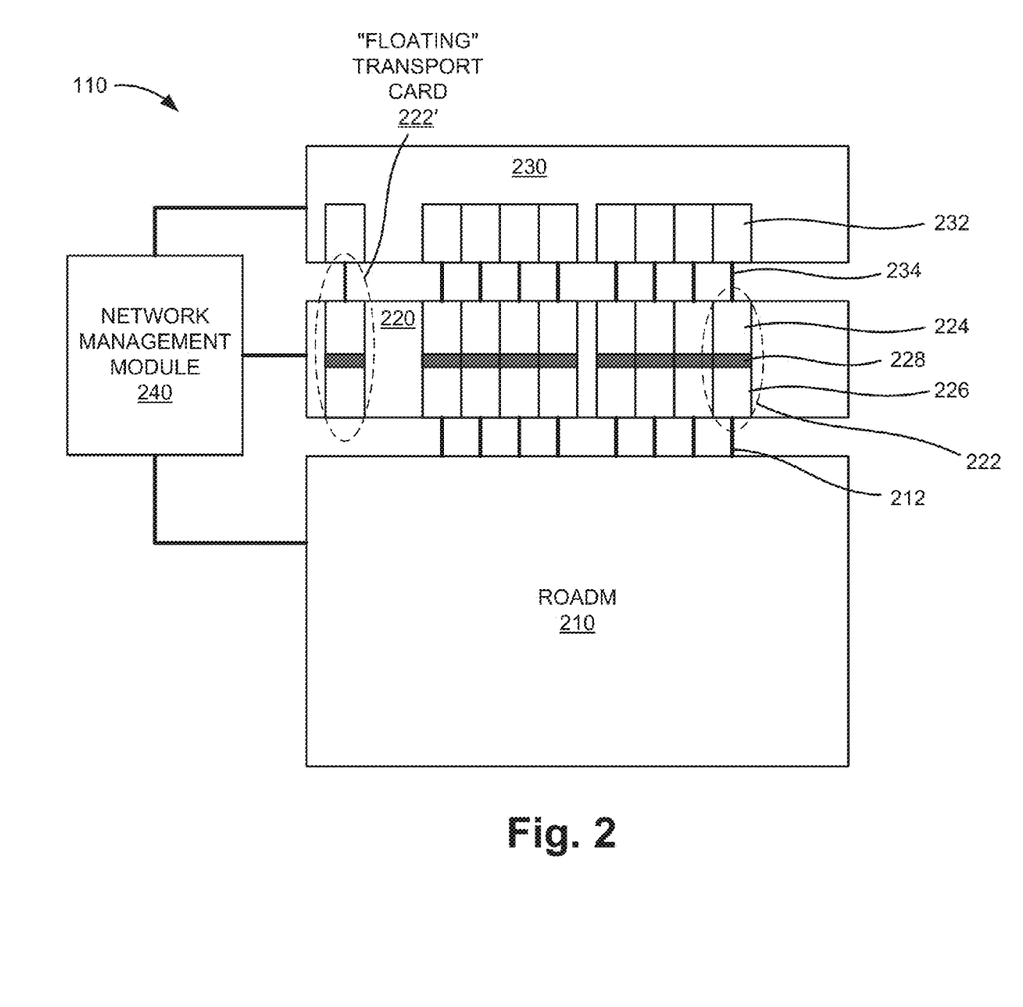
FIG. 2 is a diagram illustrating an exemplary embodiment of an optical node of FIG. 1.

FIG. 2 is a diagram illustrating components of an exemplary embodiment of optical node 110 depicted in FIG. 1. As shown in FIG. 2, optical node 110 may include a reconfigurable optical add/drop multiplexer (ROADM) 210, a transponder chassis 220, a data switch 230, and a network management module 240.

ROADM 210 can remotely switch traffic that was transmitted using wavelength division multiplexing (WDM) or DWDM at the wavelength layer. According to one implementation, ROADM 210 may include a colorless (e.g., any wavelength to any add/drop port), a directionless (e.g., any wavelength to any degree), a contentionless (e.g., any combination of wavelengths to any degree from any port), and a gridless (e.g. no fixed frequency) architecture. ROADM 210 may support any portion of the optical spectrum provided by optical network 105, any channel bit rate, and/or any modulation format. ROADM 210 may employ agile photonic connections 212 that enable changes in trunk connectivity from one transport card to a floating transport card without physically re-connecting the floating transport card to a new port. ROADM 210 is described further in connection with FIG. 3.

Figure 3:
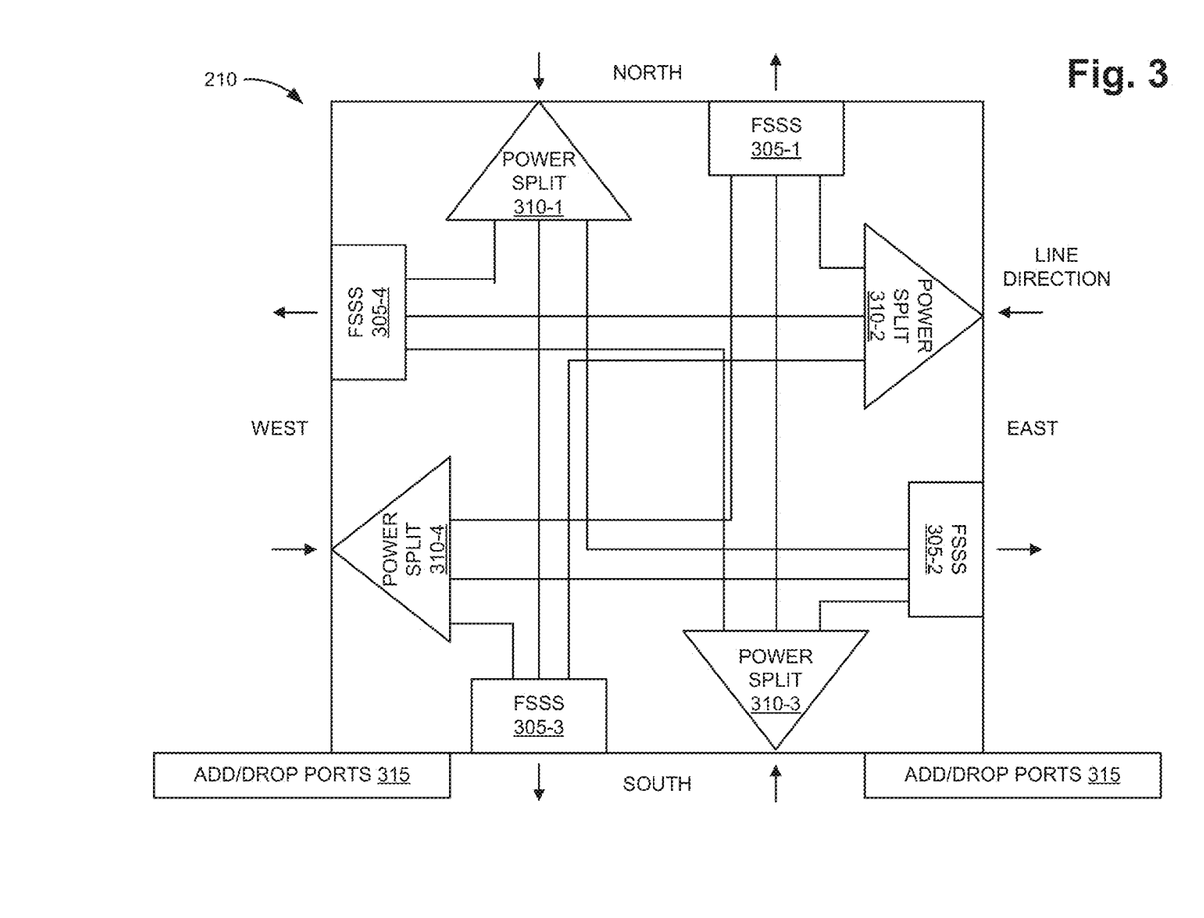
FIG. 3 is a diagram illustrating an exemplary embodiment of an add-drop multiplexer that may be included in the optical node of FIG. 2.

FIG. 3 is a diagram illustrating an exemplary embodiment of ROADM 210 that may be included in one or more of optical nodes 110. As illustrated, ROADM 210 may include, among other components, flexible spectrum selective switches (FSSSs) 305-1 through 305-4 (referred to individually as FSSS 305 or collectively as FSSSs 305), power splitters 310-1 through 310-4 (referred to individually as power splitter 310 or power splitters 310), and add/drop ports 315. According to other embodiments, ROADM 210 may have a different degree (i.e., other than a 4-degree ROADM).

The number of components and the configuration (e.g., connection between components) show in FIG. 3 are exemplary and provided for simplicity. According to other embodiments, ROADM 210 may include additional components, fewer components, different components, and/or differently-arranged components than those illustrated in FIG. 3. For example, ROADM 210 may include a channel monitor and/or an error detector. According to implementations described herein, ROADM 210 may include different configurations, such as Wavelength Crossconnect (WXC), Planar Lightwave Circuit (PLC), and Wavelength Selective Switch (WSS). According to an exemplary implementation, ROADM 210 may take the form of a ROADM blade. According to an exemplary embodiment, ROADM 210 is colorless, directionless, contentionless, and gridless.

FSSS 305 may include a spectrum selective switch that, among other things, may be able to switch any optical channel regardless of its bandwidth and central frequency. FSSS 305 may also have grid-free capability. FSSS 305 may also accommodate other features pertaining to the optical network described herein. In this regard, FSSS 305 may be distinguishable from a Wavelength Selective Switch (WSS) that is used in a conventional ROADM. Power splitter 310 may include an optical power splitter and/or an optical power combiner that is/are color-agnostic, directionless, and contentionless. Power splitter 310 may provide for splitting and/or combining of optical signals in optical fibers. Add/drop ports 315 are ports for adding and dropping optical signals.

ROADM 210 (e.g., FSSS 305) is capable of using the available spectral bandwidth in a colorless, directionless, contentionless, and gridless framework. Additionally, as previously described, ROADM 210 may switch wavelengths flexibly among transport cards. In other aspects, the total number of optical channels in the transport system is not fixed, the data rate of each optical channel is not fixed, the number of optical carriers for each optical channel is not fixed, the central frequency of an optical channel is not adherent to a fixed frequency grid, and the bandwidth and the number of optical carriers of each optical channel may be dynamically adjusted based on network traffic demands, available resources, etc.

Returning to FIG. 2, transponder chassis 220 generally includes equipment to convert signal formats between client signals (to/from data switch 230) and trunk signals (from/to ROADM 210). Client-facing "gray" optical signals generally operate at shorter wavelengths, whereas trunk signals include DWDM "colored" optical signals in a longer wavelength range. Transponder chassis 220 may include multiple transport cards 222. Each transport card 222 may be configured to convert gray optical client interface signals (e.g., from switch 230) into trunk signals that operate in the colored DWDM wavelengths used by ROADM 210. Conversely, transport card 222 may also convert signals in the "colored" DWDM wavelengths from ROADM 210 to "gray" optical client interface signals that may be used by switch 230. Each transport card 222 may include, for example, a gray optics module 224 and a line optical module 226 coupled by a processor 228 that converts signals for gray optics module 224 and line optical module 226. For example, processor 228 may include logic to convert optical signals from line optical module 224 to construct frames, packets, or other type of data containers for gray optics module 224.

In one implementation, transport card 222 may include a 100-Gbps (gigabytes per second) multi-rate transport card. Thus, in this implementation, transport card 222 may processes a 100-Gbps signal on the client side into one 100-Gbps DWDM signal on the trunk side. According to implementations described herein, transponder chassis 220 may be configured with multiple transport cards 222 that can be provisioned (e.g., tuned for a particular wavelength) without the presence of on-site personnel.

Data switch 230 may include a data transfer device, such as a router, a switch (e.g., multiprotocol label switching (MPLS) switch), a gateway, a device providing domestic switching capabilities, or some other type of device that processes and/or transfers data. In one implementation, data switch 230 may operate on data on behalf of a network providing data to/from client devices 125 and may serve as an entrance to optical network 105. In one implementation, data switch 230 may include multiple gray optics modules 232, each of which may communicate with one of transport cards 222 via a switch-transponder interface 234.

Network management module 240 may include one or multiple processors, microprocessors, multi-core processors, application specific integrated circuits (ASICs), controllers, microcontrollers, and/or some other type of hardware logic to perform the processes or functions described herein. Network management module 240 may configure the operation of optical node 110 based on information received from network management system 120 and/or optical network requirements (e.g., network traffic demands, resources available, interruptions/failures, etc.). For example, network management module 240 may identify a network failure, tune (or direct tuning of) a spare transport card 222 within node 110, and/or re-arrange a light path between nodes 110 to prevent traffic disruptions. Network management module 240 may also correlate performance and alarm information across all optical carriers.

Generally, in operation within environment 100, a transmitting-side of optical node 110 may output optical signals to optical links 115, which may traverse light paths in optical network 105. A receiving-side of optical nodes 110 may be configured both in terms of operation and available node resources for full bandwidth utilization.

According to implementations described herein, one or more transport cards 222 may be used as a "floating" transport card 222', such that the wavelength of the floating transport card 222' can be tuned to replace any one of the other transport cards 222. Upon network management module 240 detecting a failure of one of transport cards 222, the floating transport card 222' may be automatically configured to replace the failed transport card 222 within transponder chassis 220. The application of a single floating transport card 222' (or any amount of floating transport cards less than the total amount of active cards) in optical nodes 110 can significantly reduce idle capacity in optical network 105. For example, the number of unused and/or under-utilized gray optics modules 224/232 and line optical modules 226 may be reduced to as few as a single spare in each optical node 110, while the remaining active components may operate at or near one hundred percent capacity, when required.

For a single node with individual card failures, one floating transport card 222' can generally provide sufficient protection to achieve required reliability metrics (e.g., 99.99%). If there is a probability of multiple card failures in a single optical node 110, more than one floating transport card 222' may be used. However, the probability of multiple simultaneous card failures in most optical node applications would be so small as to not affect reliability calculations. If the total number of floating transport cards 222' and active transport cards 222 are not enough to support all working connections during an event where an entire core node is disabled, additional floating transport cards 222' may be implemented in the core nodes of a particular optical network while a single floating transport card 222 may provide adequate protection for aggregation nodes.

The number of components and the configuration (e.g., connection between components) shown in FIG. 2 are exemplary and provided for simplicity. According to other embodiments, optical node 110 may include additional components, fewer components, different components, and/or differently-arranged components than those illustrated in FIG. 2. For example, optical node 110 may include a laser, a power source, an optical amplifier (e.g., Erbium Doped Fiber Amplifier (EDFA), Raman amplifier, etc.), digital signal processing (DSP) (e.g., forward error correction (FEC), equalization, filtering, etc), etc. that are not depicted in FIG. 2.

Figure 4:
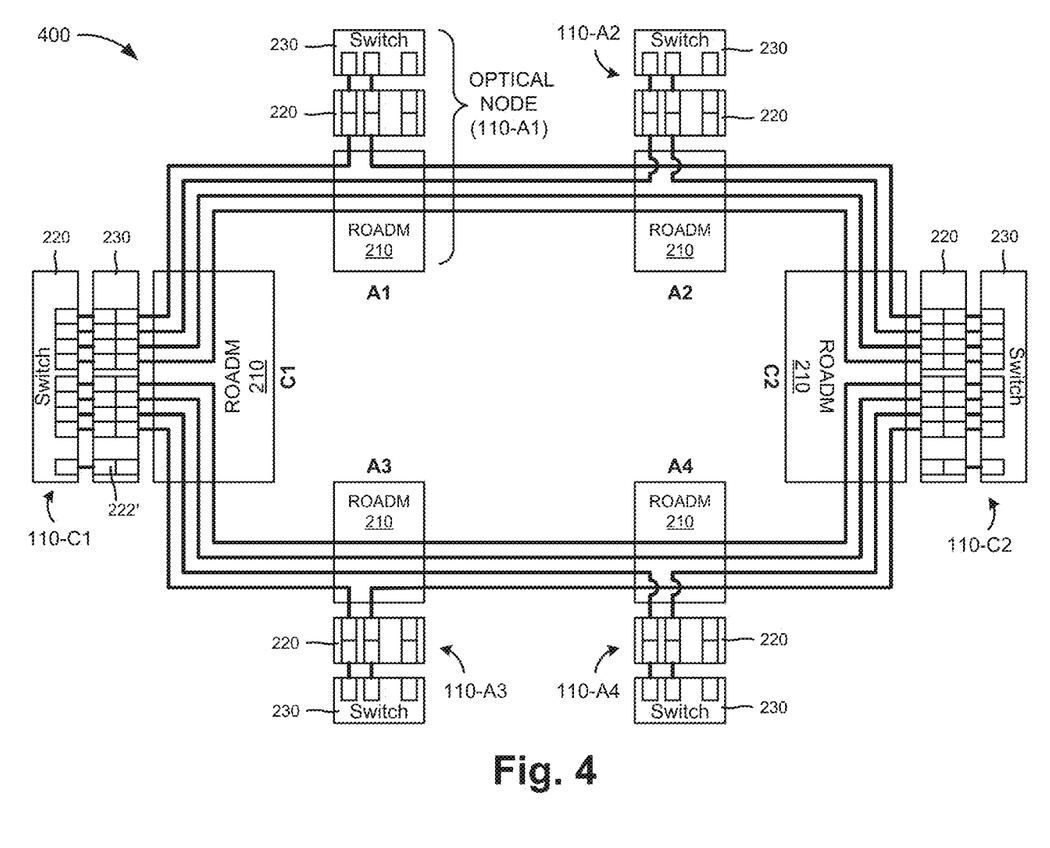
FIG. 4 is a schematic diagram of an exemplary portion of the optical network of FIG. 1.

FIG. 4 provides a simplified schematic of a portion 400 of optical network 105 configured according to an implementation described herein. As shown in FIG. 4, network portion 400 may include a ring topology with six optical nodes 110, two of which are core nodes (e.g., 110-C1 and 110-C2) and four of which are aggregation nodes (e.g., 110-A1, 110-A2, 110-A3, and 110-A4). Each optical node (e.g., 110-C1, 110-C2, 110-A1, 110-A2, 110-A3, and 110-A4) may include a ROADM 210, a transponder chassis 220, a data switch 230, and a network management module 240 (not shown in FIG. 4 for clarity), as described above in connection with FIGS. 2 and 3.

In the configuration of FIG. 4, traffic does not flow directly between aggregation nodes (e.g., directly from nodes 110-A1 to 110-A2, etc.). Thus, traffic patterns in network portion 400 may include links between core nodes 110-C1 and 110-C2 and links between core nodes 110-C1/110-C2 and any of aggregation nodes 110-A1 through 110-A4. Assume network portion 400 is configured to meet an initial traffic demand of 1200 Gbps. Particularly, the initial traffic demand between nodes 110-C1, 110-C2, 110-A1, 110-A2, 110-A3, and 110-A4 may be defined as shown in Table 1.

TABLE 1

Initial Traffic Demand between Nodes (Gbps)

| NODE | C1 | C2 | A1 | A2 | A3 | A4 |
|------|-----|-----|-----|-----|-----|-----|
| C1 | — | 400 | 100 | 100 | 100 | 100 |
| C2 | — | — | 100 | 100 | 100 | 100 |
| A1 | — | — | — | 0 | 0 | 0 |
| A2 | — | — | — | — | 0 | 0 |
| A3 | — | — | — | — | — | 0 |
| A4 | — | — | — | — | — | — |

To support the required traffic demand, according to one embodiment, each core node (e.g., 110-C1 and 110-C2) may include nine 100 Gbps card sets. Eight card sets may be provisioned to support the traffic demand for the core node (e.g., 800 Gbps total) and one card set may be installed as a floating transport card set (e.g., 100 Gbps). Additionally, each aggregation node (e.g., 110-A1 through 110-A4) may include three card sets of 100 Gbps line cards and 100 Gbps gray optics modules. Two card sets may be provisioned to support the traffic demand for the aggregation node (e.g., 200 Gbps total) and one card set may be installed as a floating transport card set (e.g., 100 Gbps). Particularly, each card set would include a line optical module 226 and a gray optics module 224 paired to a gray optics module 232.

Generally, according to implementations described herein, network portion 400 may be configured to provide a required bandwidth with no additional wavelength reservation for protection (e.g., full bandwidth utilization). Each of the optical nodes 110 may include card sets (e.g., line optical module 226 and a gray optics module 224 paired to a gray optics module 232) with a majority (e.g., two or more) of the card sets provisioned as active cards to receive a traffic load of up to full capacity of the card sets and a minority (e.g., as few as one) of the card sets provisioned as floating spare cards for the active cards.

In the configuration of FIG. 4, network portion 400 may support an overall traffic capacity of 1200 Gbps, with reliable backup capacity, while using significantly less dedicated hardware than a typical 1+1 protection architecture. Particularly, the configuration of network portion 400 may use a total of thirty 100 Gbps card sets (e.g., twenty-four active card sets with six floating backup card sets) distributed among nodes 110-C1, 110-C2, 110-A1, 110-A2, 110-A3, and 110-A4 (with each card set including a line optical module 226, a gray optics module 224, and a gray optics module 232). By contrast, a typical 1+1 protection architecture for the same capacity and traffic pattern would require a total of forty-eight 100 Gbps card sets (e.g., twenty-four active card sets with twenty-four fixed backup card sets) distributed among nodes 110-C1, 110-C2, 110-A1, 110-A2, 110-A3, and 110-A4.

Protection of network portion 400 may include protection from card failures within nodes, fiber failures between nodes, and node failures. Individual card failures within an optical node 110 (e.g. failure of a line optical module 226, a gray optics module 224, or a gray optics module 232) may prevent communications between two particular nodes 110. Fiber failures (e.g., a fiber cut) may disrupt communications between multiple nodes 110. Node failures may disrupt communications to the failed node 110 and light paths that pass through the failed node 110. Network management system 120 and/or the network management modules 240 in each node 110 may monitor network portion 400 for failures/alarms due to card failures within nodes, fiber failures between nodes, and node failures. For example, network management modules 240 may detect a local failure or series of transmission time-outs for an individual card set or multiple card sets. Additionally, or alternatively, network management system 120 may receive input from multiple network management modules 240 to determine a mode of failure, such as failed communications along multiple light paths that are indicative of a fiber failure or multiple card failures at a single optical node 110 that are indicative of a node failure.

Network management system 120 and/or the network management modules 240 may initiate reconfiguration of light paths and/or card sets to avoid traffic disruptions until normal operations can be restored. For example, network management system 120 and/or the network management modules 240 may utilize floating spare cards until additional network repairs (e.g., by a service technician) can be provided to restore failed components.

Although FIG. 4 show exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5A:
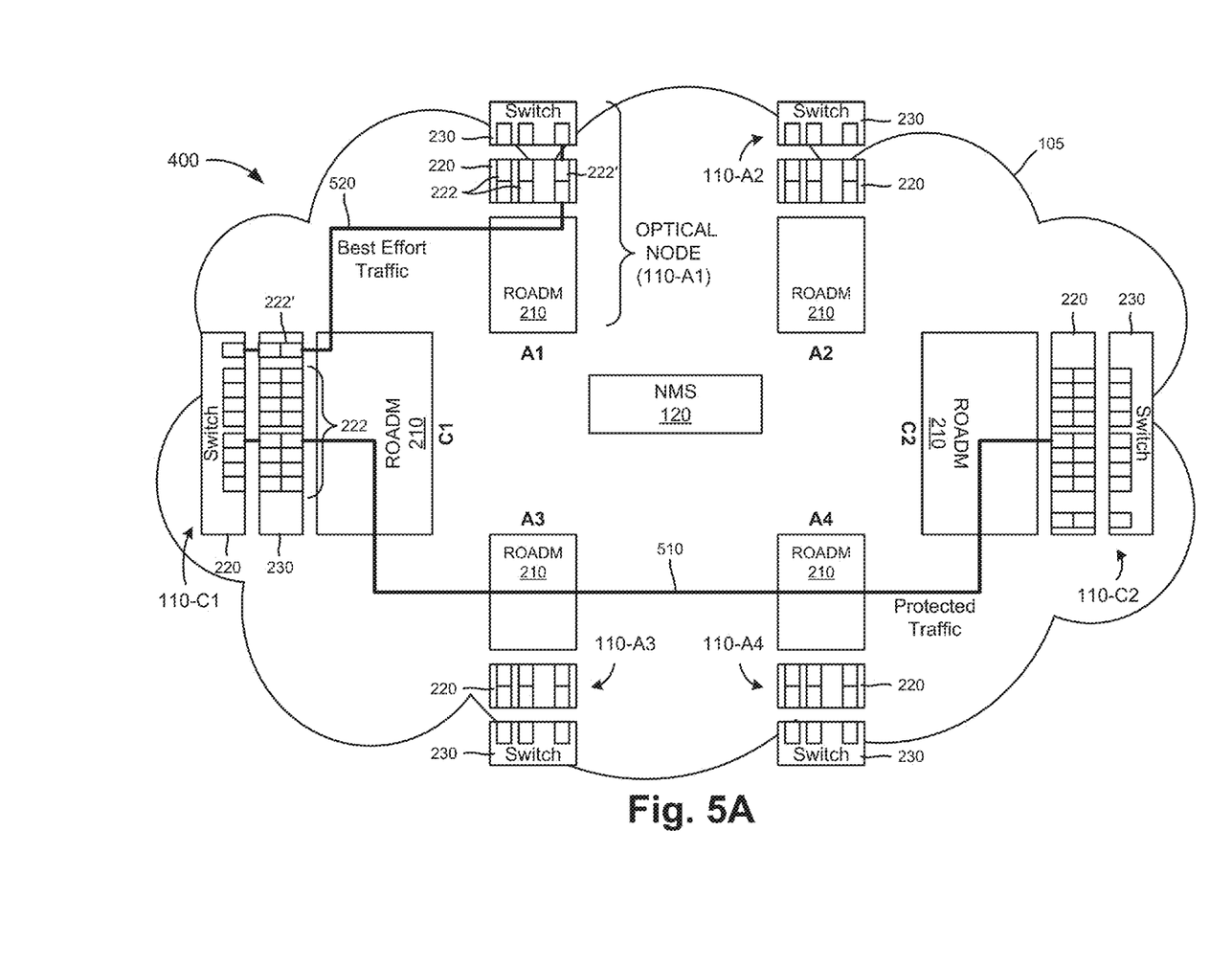
FIGS. 5A and 5B are schematic diagrams of a simplified failure protection scheme in a portion of the optical network of FIG. 4.
Figure 5B:
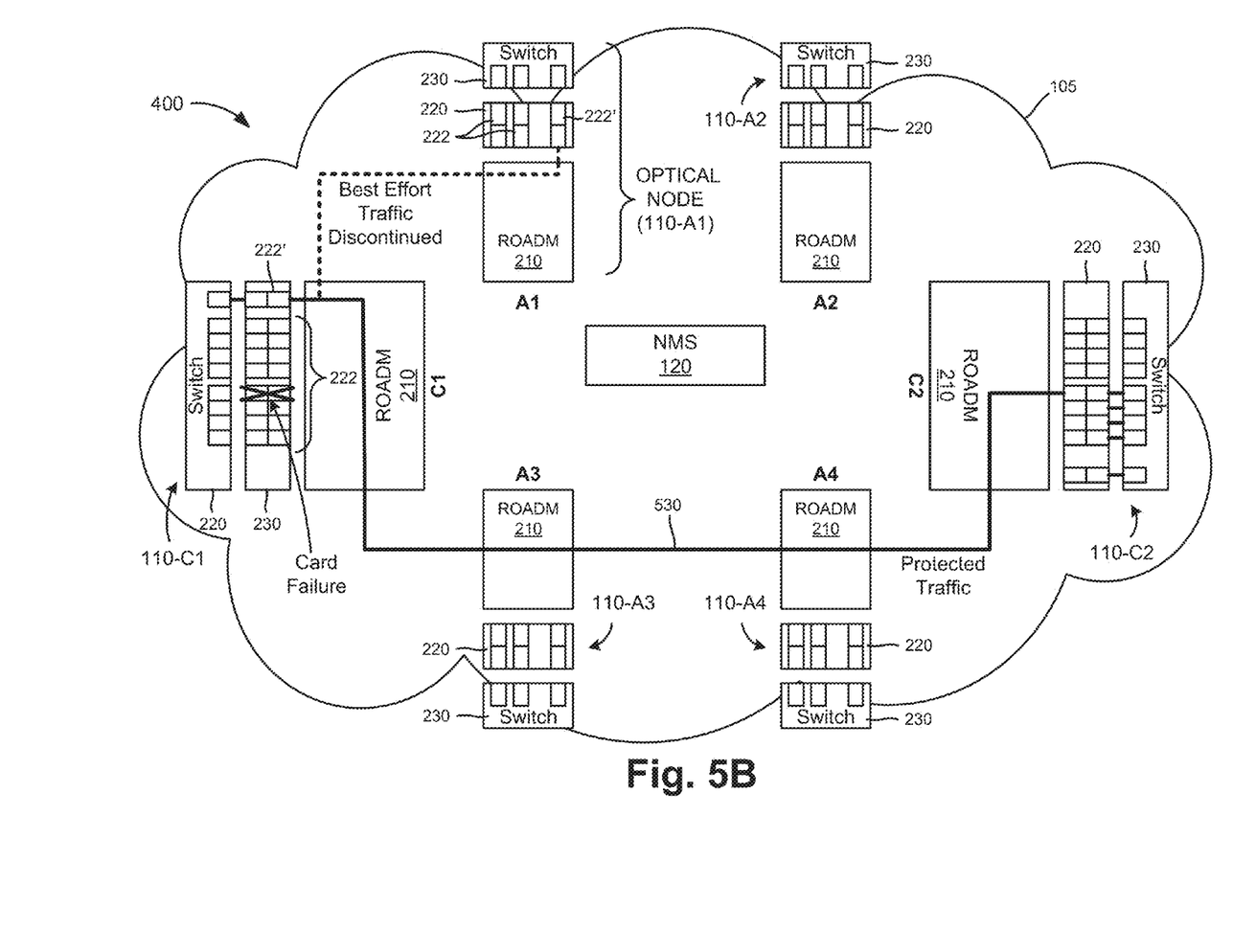

FIGS. 5A and 5B are schematic diagrams of a simplified failure protection scheme in network portion 400. Particularly, FIG. 5A shows a protected traffic path 510 between core nodes 110-C1 and 110-C2 with a path 520 to transport best-effort traffic between core node 110-C1 and aggregation node 110-A1. FIG. 5B shows path 520 disabled with a floating transport card 222' reconfigured to resolve a card failure for protected traffic path 530.

Referring to FIG. 5A, network portion 400 is shown in normal operation with no failures for a particular light path 510 between core nodes 110-C1 and 110-C2 (via aggregation nodes 110-A3 and 110-A4). Network management system 120 may establish a data connection to a pair of floating transport cards 222' so that best-effort traffic can be carried on a link between unused spare cards. In the example of FIG. 5A, best effort traffic may be routed on a path 520 between floating transport card 222' of core node 110-C1 and floating transport card 222' of aggregation node 110-A1 during normal operation (e.g., no failures) of network portion 400.

If a failure event occurs that requires use of either floating transport card 222' of core node 110-C1 or floating transport card 222' of aggregation node 110-A1, network management system 120 causes traffic from a path affected by the failure to shift to the appropriate floating transport card 222'. As shown in the example of FIG. 5B, failure of a transport card 222 in core node 110-C1 affects path 510. Floating transport card 222' of core node 110-C1 stops carrying best effort traffic for path 520 and starts to carry working traffic for path 530. When the failure affecting path 510 is repaired, protected traffic may be rerouted on path 510 (FIG. 5A) with floating transport card 222' being made available to resume carrying best-effort traffic.

Selection of floating transport card 222' pairs for carrying best-effort traffic may be provided by manual input (e.g., direction from a network administrator) or via an automated selection process implemented by, for example, network management system 120. In one implementation, network management system 120 may receive feedback from a data link layer device (e.g., data switch 230 or a Layer 2 control device) indicating congestion at a particular interface. For example, a data switch 230 in one of nodes 110 may indicate dropped best-effort packets or a queue backlog for best-effort packets. Network management system 120 may determine if a pair of floating transport cards 222' is available at particular nodes 110 that correspond to the congested path (e.g., between core nodes 110-C1 and aggregation node 110-A1 in FIG. 5A) and provision the appropriate floating transport cards 222' to carry best-effort traffic from the congested path. If no failure events disrupt the carrying best effort traffic over path 520 (e.g., that requires use of either of the pair of floating transport cards 222'), network management system 120 may maintain the provisioning of the pair of floating transport cards 222' until the congestion level is reduced and/or network management system 120 receives another congestion indication for a different link.

Figure 6:
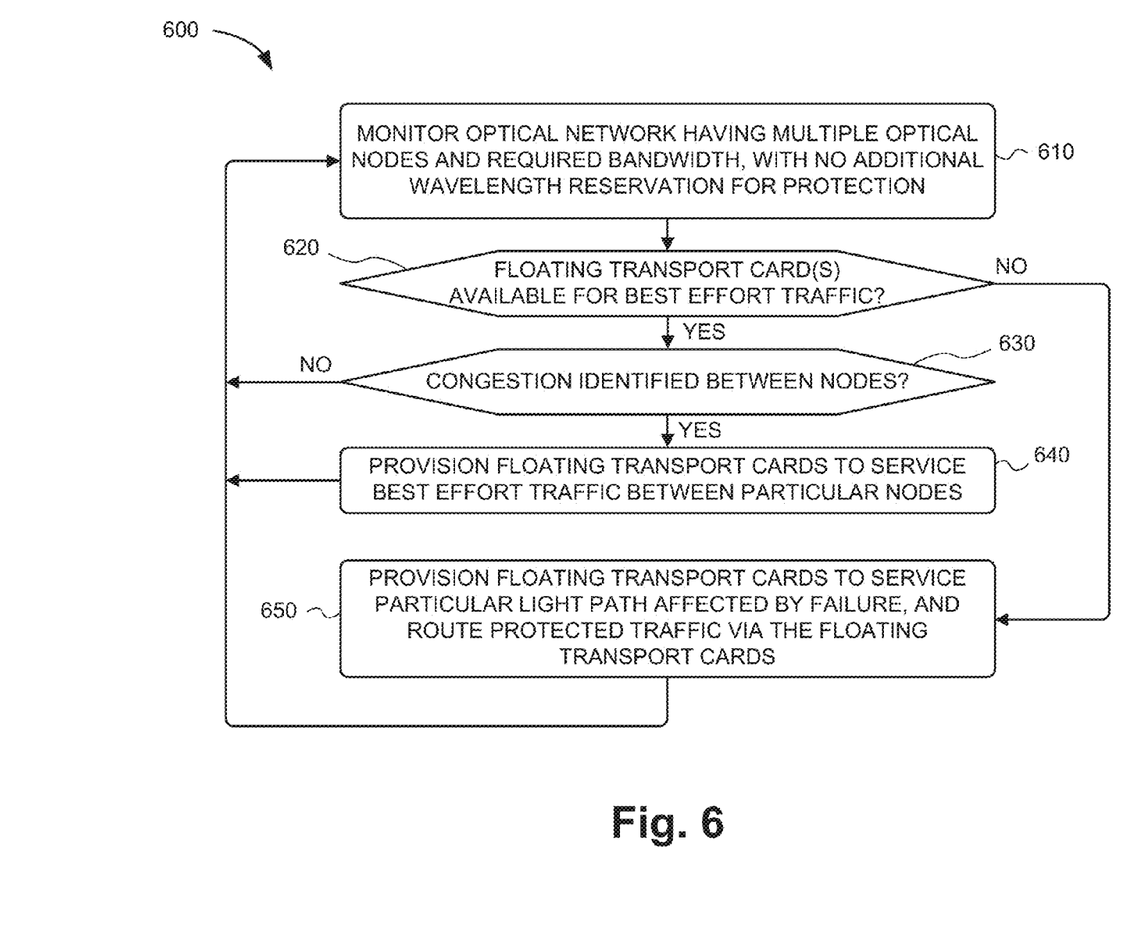
FIG. 6 is a flow diagram illustrating an exemplary process to manage an optimized protection scheme in an optical network.

FIG. 6 is a flow diagram illustrating an exemplary process 600 to manage an optical network according to an implementation described herein. According to an exemplary embodiment, process 600 may be performed by network management system 120. According to another embodiment, the exemplary processes may be performed by a combination of network management system 120 and network management module 240. According to yet another exemplary embodiment, the exemplary processes may be performed by one or more network management modules 240. Parts of process 600 are described below in connection with FIGS. 4, 5A, and 5B.

Referring to FIG. 6, process 600 may include monitoring an optical network having multiple optical nodes and a required bandwidth, with no additional wavelength reservation for protection (block 610). For example, as shown in FIG. 4, network portion 400 may include multiple core nodes (core nodes 110-C1 and 110-C2) and aggregation nodes (aggregation nodes 110-A1 through 110-A4) connected by light paths with no additional wavelength reservation. Each node 110 may include transport cards 222 with a majority of the transport cards provisioned as active cards to receive a traffic load of up to full capacity of the card sets and a minority of the transport cards provisioned as floating transport cards 222' for the active cards. In the configuration of FIGS. 4, 5A and 5B, each node 110 may include a single floating transport card 222'. However, additional floating card sets (e.g., some number of card sets less than the number of active card sets) may be used at particular nodes. Network management system (NMS) 120 and/or network management modules 240 (FIG. 2) may monitor optical network portion 400 to identify any failures in the optical network.

Process 600 may also include determining if one or more floating transport cards are available for use with best-effort traffic (block 620). For example, referring to FIGS. 5A and 5B, network management system 120 and/or network management modules 240 may monitor network portion 400 identify any of a transport card failure, a fiber failure, or a node failure that could require use of a floating transport card 222'. In one implementation, network management modules 240 may indicate a local failure or transmission time-out for an individual transport card set 222 or multiple card sets. In another implementation, network management system 120 may receive input from multiple network management modules 240 to determine a mode of failure. For example, network management system 120 may identify failed communications along multiple light paths to determine a fiber failure. Alternatively, network management system 120 may identify multiple card failures at a single optical node 110 to detect a node failure. Any of the above failures may require use of floating transport cards 222' for appropriate protection/recovery actions, which would preclude use of the floating transport cards 222' for other uses, such as forwarding low-priority (best-effort) traffic. Conversely, any floating transport cards 222' not being used for failure-recovery may be considered available for forwarding other (e.g., low priority) traffic.

If floating transport cards are available for use with best-effort traffic (block 620—YES), process 600 may include identifying if there is congestion between nodes that have available floating transport cards (block 630). For example, referring to FIG. 5A, network management system 120 and/or network management modules 240 may detect high bandwidth use between core node 110-C1 and aggregation node 110-A1, such that proving required services to protected traffic may result in congestion of low priority traffic.

If there is no congestion between nodes that have available floating transport cards 222' (block 630—NO), process 600 may return to process block 610 to continue monitoring the optical network. For example, if no congestion is detected at nodes with available floating transport cards 222', network management system 120 and/or network management modules 240 may continue to send traffic over protected path 510 and monitor network portion 400.

If there is congestion between nodes that have available floating transport cards (block 630—YES), process 600 may include provisioning floating transport cards to service best-effort traffic between nodes with congestion and have available floating transport cards (block 640). For example, in the configuration of FIG. 5A, network management system 120 and/or network management modules 240 may provision floating transport cards 222' in core node 110-C1 and aggregation node 110-A1, respectively, to supplement data transmissions between core node 110-C1 and aggregation node 110-A1 via path 520. In one implementation, path 520 may be configured to transmit only low priority traffic between core node 110-C1 and aggregation node 110-A1, so that any unplanned disabling of path 520 (e.g., in the event of a failure recovery action) does not affect protected network traffic.

As shown in FIG. 6, after provisioning the floating spare cards to service best-effort traffic, network management system 120 and/or network management modules 240 may continue to monitor network portion 400 to determine the continued availability of floating transport cards 222' in core node 110-C1 and aggregation node 110-A1 for best-effort traffic.

Referring again to block 620, if floating transport cards are not available for use with best-effort traffic (block 620—NO), process 600 may include provisioning floating transport cards to service a particular light path affected by a failure, and routing protected traffic via the floating transport cards (block 650). For example, network management system 120 and/or network management modules 240 may identify a card failure within nodes, fiber failures between nodes, and node failures. In the example of FIG. 5B, network management system 120 and/or network management modules 240 may detect a card failure within core node 110-C1 that disrupts light path 510. Network management system 120 and/or network management modules 240 may disconnect light path 520 and re-provision floating transport card 222' in core node 110-C1 to enable continued functioning of light path 510. Floating transport card 222' at node 110-C1 may be used to replace the failed card/interface. ROADM 210 of core node 110-C1 may direct a new light path 530 (e.g., using the same wavelength that was previously reserved for the failed card/light path 510) from floating transport card 222' to the corresponding transport card 222 at node 110-C2. The transition from the failed card to floating transport card 222' in node 110-C1 may be performed without physical intervention from a technician.

Although FIG. 6 illustrates an exemplary process 600 to manage an optimized protection scheme in an optical network, according to other implementations, process 600 may include additional operations, fewer operations, and/or different operations than those illustrated in FIG. 6 and described.

Figure 7:
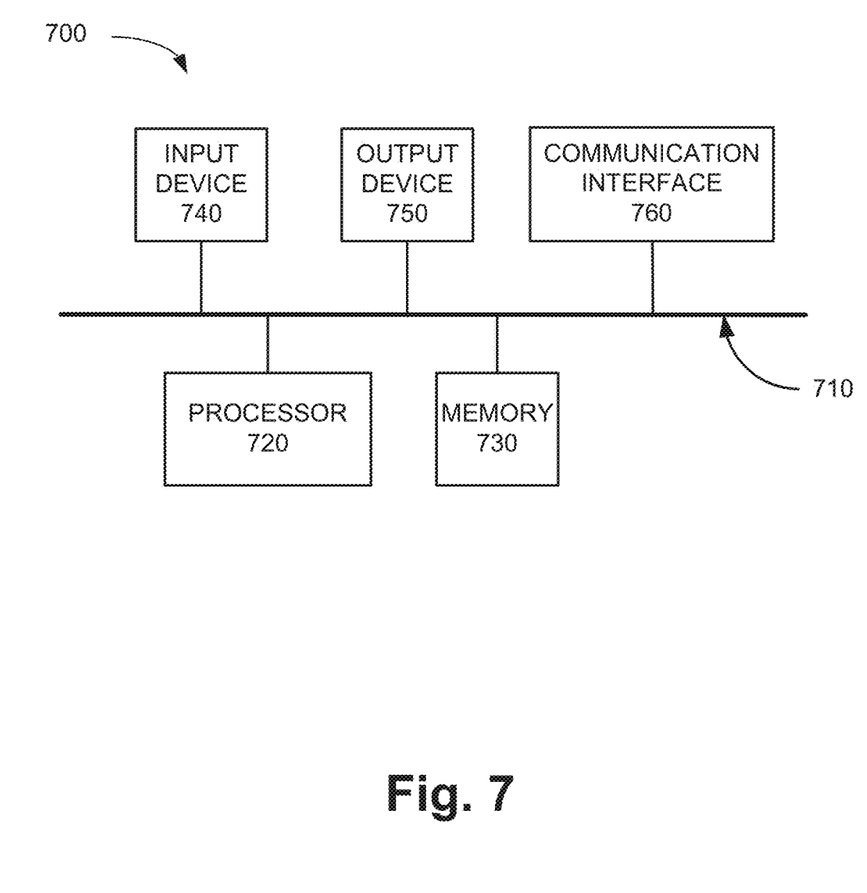
FIG. 7 is a diagram illustrating exemplary components that may be included in one or more devices of FIG. 1.

FIG. 7 is a diagram illustrating exemplary components of a device 700 according to an implementation described herein. Node 110 (e.g., network management module 240), network management system 120, and device 125 may each include one or more devices 700. As shown in FIG. 7, device 700 may include a bus 710, a processor 720, a memory 730, an input device 740, an output device 750, and a communication interface 760.

Bus 710 may include a path that permits communication among the components of device 700. Processor 720 may include any type of single-core processor, multi-core processor, microprocessor, latch-based processor, and/or processing logic (or families of processors, microprocessors, and/or processing logics) that interprets and executes instructions. In other embodiments, processor 720 may include an application-specific integrated circuit (ASIC), a field-programmable gate array (FPGA), and/or another type of integrated circuit or processing logic.

Memory 730 may include any type of dynamic storage device that may store information and/or instructions, for execution by processor 720, and/or any type of non-volatile storage device that may store information for use by processor 720. For example, memory 730 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 740 may allow an operator to input information into device 700. Input device 740 may include, for example, a keyboard, a mouse, a pen, a microphone, a remote control, an audio capture device, an image and/or video capture device, a touch-screen display, and/or another type of input device. In some embodiments, device 700 may be managed remotely and may not include input device 740. In other words, device 700 may be "headless" and may not include a keyboard, for example.

Output device 750 may output information to an operator of device 700. Output device 750 may include a display, a printer, a speaker, and/or another type of output device. For example, device 700 may include a display, which may include a liquid-crystal display (LCD) for displaying information. In some embodiments, device 700 may be managed remotely and may not include output device 750. In other words, device 700 may be "headless" and may not include a display, for example.

Communication interface 760 may include a transceiver that enables device 700 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 760 may include a transmitter that converts baseband signals to radio frequency (RF) signals and/or a receiver that converts RF signals to baseband signals. Communication interface 760 may be coupled to an antenna for transmitting and receiving RF signals.

Communication interface 760 may include a logical component that includes input and/or output ports, input and/or output systems, and/or other input and output components that facilitate the transmission of data to other devices. For example, communication interface 760 may include a network interface card (e.g., Ethernet card) for wired communications and/or a wireless network interface (e.g., a WiFi) card for wireless communications. Communication interface 760 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described above, device 700 may perform certain operations relating to managing an optimized protection scheme in an optical network. Device 700 may perform these operations in response to processor 720 executing software instructions contained in a computer-readable medium, such as memory 730. A computer-readable medium may be defined as a non-transitory memory device. A memory device may be implemented within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of, or in combination with, software instructions to implement processes described herein. Thus, implementations described herein are not limited to any specific combination of hardware circuitry and software.

Although FIG. 7 shows exemplary components of device 700, in other implementations, device 700 may include fewer components, different components, additional components, or differently arranged components than depicted in FIG. 7. Additionally or alternatively, one or more components of device 700 may perform one or more tasks described as being performed by one or more other components of device 700.

According to an exemplary embodiment described herein, a method may be performed by a network management device. The method may include monitoring an optical network configured for a required bandwidth. The optical network may include multiple optical nodes and a plurality of light paths between the multiple optical nodes. The multiple optical nodes may include transport cards, with a majority of the transport cards provisioned as active cards to receive a traffic load of up to full capacity of the transport cards, and with a minority of the transport cards provisioned as floating spare cards for the active cards. The method may also include identifying an unused first floating spare card and an unused second floating spare card in a pair of the multiple optical nodes and automatically provision the first floating spare card and the second floating spare card to service a light path for best-effort traffic between the pair of the multiple optical nodes.

According to implementations described herein, the optical network may provide savings in gray optics and transport cards while eliminating the need to reserve idle capacity for traffic protection purposes. The optical network may be configured to use full wavelength spectrum to meet bandwidth requirements for the network while requiring minimal spare cards. Furthermore, spare transport cards may be used to supplement delivery of best-effort traffic between nodes when the spare transport cards are not being used to support protected traffic (e.g., when spare transport cards are not being used for failure recovery).

The foregoing description of implementations provides illustration, but is not intended to be exhaustive or to limit the implementations to the precise form disclosed. Accordingly, modifications to the implementations described herein may be possible. For example, while terms related to metro optical networks or ULH networks be used herein, embodiments described herein may be used in any type of optical network with nodes providing optical transport with optional back-up transport cards in the event of failure.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the process illustrated in FIG. 6, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms of software and/or firmware executed by hardware. For example, a process or a function may be implemented as "logic" or as a "component." The logic or the component may include, for example, hardware, a combination of hardware and software, a combination of hardware and firmware, or a combination of hardware, software, and firmware. By way of example, hardware may include a processor. The processor may include, for example, one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs) to interpret and/or execute instructions and/or data.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method comprising:
    monitoring an optical network that is configured for a required bandwidth,
        wherein the optical network includes multiple optical nodes and a plurality of light paths between the multiple optical nodes, each of the plurality of light paths being provisioned with particular wavelengths and the optical network being provisioned to use a full available wavelength spectrum for protected traffic without reservation for protection of the required bandwidth, and
        wherein each of the multiple optical nodes includes:
            a reconfigurable optical add/drop multiplexer (ROADM) that is colorless, directionless, contentionless, and gridless, the ROADM including flexible spectrum selective switches and add/drop ports, and
            transport cards with a majority of the transport cards provisioned as active cards to receive a traffic load of up to full capacity of the transport cards, and with a minority of the transport cards provisioned as floating spare cards for the active cards;
    detecting, by a network management device and between a pair of the multiple optical nodes, one of dropped best-effort packets or a queue backlog for best-effort packets for a first light path of the plurality of light paths;
    identifying, by the network management device and in response to the detecting, an unused first floating spare card and an unused second floating spare card in the pair of the multiple optical nodes;
    automatically directing, by the network management device, tuning of the first floating spare card and the second floating spare card to a first wavelength, of the first light path, to service best-effort traffic between the pair of the multiple optical nodes;
    sending, using one or more of the flexible spectrum selective switches, the best-effort traffic between the first floating spare card and the second floating spare card, of the pair of the multiple optical nodes, via the first wavelength;
    automatically disabling, by the network management device and in response to a failure event in one of the plurality of light paths, the service of best-effort traffic between the pair of the multiple optical nodes; and
    automatically directing, by the network management device and in response to the failure event, tuning of one or more of the first floating spare card and the second floating spare card to a second wavelength, for one of the plurality of light paths, to service protected traffic impacted by the failure event, wherein the second wavelength matches a wavelength of the failed light path.

2. The method of claim 1, wherein automatically directing tuning of the one or more of the first floating spare card and the second floating spare card to a second wavelength includes:
    re-provisioning, by the network management device, the first floating spare card and the second floating spare card to service a particular light path associated with the transport card failure, and routing the light path associated with a failed transport card to the one of the floating spare cards.

3. The method of claim 1, wherein detecting the one of dropped best-effort packets or the queue backlog for best-effort packets further comprises:
    receiving an indication of congestion from a Layer 2 network device associated with one of the optical nodes of the pair of the multiple optical nodes.

4. The method of claim 1, further comprising:
    identifying, by the network management device, the failure event in the optical network.

5. The method of claim 4, wherein the failure event in the optical network is one of a transport card failure, a fiber failure, or a node failure.

6. The method of claim 5, wherein automatically automatically directing tuning of the one or more of the first floating spare card and the second floating spare card to a second wavelength includes:
provisioning the first floating spare card and the second floating spare card to service a particular light path associated with the transport card failure, and routing the light path associated with a failed transport card to the one of the floating spare cards;
re-routing traffic around the fiber failure while maintaining the required bandwidth; or
provisioning the first floating spare card or the second floating spare card to reconfigure at least some of the plurality of light paths to route traffic around a failed node.

7. The method of claim 4, wherein, when automatically directing the tuning of the one or more of the first floating spare card and the second floating spare card to the second wavelength, the one or more of the first floating spare card and the second floating spare card are provisioned to use wavelengths previously assigned for communications with a failed node.

8. The method of claim 1, wherein the multiple nodes include core nodes and aggregation nodes and wherein the optical network is configured such that traffic does not flow directly between aggregation nodes.

9. The method of claim 1, wherein the minority of the transport cards provisioned as floating spare cards includes no more than two floating spare cards at each of the multiple optical nodes.

10. The method of claim 9, wherein the minority of the transport cards provisioned as floating spare cards include exactly one floating spare card at each of the multiple optical nodes.

11. The method of claim 1, wherein the optical network is a long-haul optical network.

12. The method of claim 1, wherein each of the transport cards includes a 100-Gbps (gigabytes per second) multi-rate transport card.

13. A network management device, comprising:
a memory to store a plurality of instructions; and
one or more processors configured to:
monitor a network that is configured for a required bandwidth,
wherein the network includes multiple optical nodes with a plurality of light paths between the multiple optical nodes,
wherein each of the multiple optical nodes includes a reconfigurable optical add/drop multiplexer (ROADM) that is colorless, directionless, contentionless, and gridless, the ROADM including flexible spectrum selective switches and add/drop ports, and transport cards with a majority of the transport cards provisioned as active cards to receive a traffic load of up to full capacity of the transport cards, and with a minority of the transport cards provisioned as floating spare cards for the active cards, and
wherein each of the plurality of light paths being provisioned with particular wavelengths and the network being provisioned to use a full available wavelength spectrum for protected traffic without reservation for protection of a required bandwidth;
detect, between a pair of the multiple optical nodes, one of dropped best-effort packets or a queue backlog for best-effort packets for a first light path of the plurality of light paths;
identify, in response to the detecting, an unused first floating spare transport card and an unused second floating spare transport card in the pair of the multiple optical nodes;
direct tuning of the first floating spare transport card and the second floating spare transport card to a first wavelength, of the first light path, to service best-effort traffic between the pair of the multiple optical nodes;
direct sending, using one or more of the flexible spectrum selective switches, of the best-effort traffic between the first floating spare card and the second floating spare card, of the pair of the multiple optical nodes, via the first wavelength;
disable, in response to a failure event in one of the plurality of light paths, the service of best-effort traffic between the pair of the multiple optical nodes; and
direct, in response to the failure event, tuning of one or more of the first floating spare card and the second floating spare card to a second wavelength, for one of the plurality of light paths, to service protected traffic impacted by the failure event, wherein the second wavelength matches a wavelength of the failed light path.

14. The network management device of claim 13, wherein the one or more processors are further configured to:
identify a high traffic condition between the pair of the multiple optical nodes.

15. The network management device of claim 13, wherein the network is a long-haul optical network.

16. The network management device of claim 13, wherein, when detecting the one of dropped best-effort packets or the queue backlog for best-effort packets, the one or more processors are further configured to:
receive an indication of congestion from a Layer 2 network device associated with one of the optical nodes of the pair of the multiple optical nodes.

17. The network management device of claim 13, wherein the one or more processors are further configured to:
identify a failure to one of the active transport cards for the failed light path.

18. The network management device of claim 17, wherein, when directing tuning of one or more of the first floating spare card and the second floating spare card to a second wavelength, the one or more processors are further configured to:
route the light path associated with the failed transport card to the first floating spare transport card or the second floating spare transport card.

19. A non-transitory computer-readable medium, storing instructions executable by one or more processors, the non-transitory computer-readable medium comprising instructions to:
monitor an optical network configured for a required bandwidth,
wherein the optical network includes multiple optical nodes and a plurality of light paths between the multiple optical nodes,
wherein each of the multiple optical nodes includes a reconfigurable optical add/drop multiplexer (ROADM) that is colorless, directionless, contentionless, and gridless, the ROADM including flexible spectrum selective switches and add/drop ports, and transport cards with a majority of the transport cards provisioned as active cards to receive a traffic load of up to full capacity of the transport cards, and with a minority of the transport cards provisioned as floating spare cards for the active cards, and wherein each of the plurality of light paths is provisioned with particular wavelengths and the optical network is provisioned to use a full available wavelength spectrum for protected traffic without reservation for protection of the required bandwidth;

detect, between a pair of the multiple optical nodes, one of dropped best-effort packets or a queue backlog for best-effort packets for a first light path of the plurality of light paths;

identify an unused first floating spare card and an unused second floating spare card in the pair of the multiple optical nodes;

automatically direct tuning of the first floating spare transport card and the second floating spare transport card to a first wavelength, of the first light path, to service a light path for best-effort traffic between the pair of the multiple optical nodes;

send, using one or more of the flexible spectrum selective switches, the best-effort traffic between the first floating spare card and the second floating spare card, of the pair of the multiple optical nodes, via the first wavelength;

automatically disable, in response to a failure event in one of the plurality of light paths, the service of best-effort traffic between the pair of the multiple optical nodes; and automatically direct, in response to the failure event, tuning of one or more of the first floating spare card and the second floating spare card to a second wavelength, for one of the plurality of light paths, to service protected traffic impacted by the failure event, wherein the second wavelength matches a wavelength of the failed light path.

20. The non-transitory computer-readable medium of claim 19, further comprising instructions to:

identify a failure event in the optical network.

\* \* \* \* \*